(12) United States Patent
Izuhara et al.

(10) Patent No.: US 11,784,713 B2
(45) Date of Patent: Oct. 10, 2023

(54) WIDE AND FULLY FLEXIBLE TWO-ELECTROMAGNETIC-BEAM STEERING DEVICE

(71) Applicant: SCIDATEK INC., Austin, TX (US)

(72) Inventors: Tomoyuki Izuhara, Pleasanton, CA (US); Louay Eldada, Austin, TX (US)

(73) Assignee: SCIDATEK INC., Austin, TX (US)

( * ) Notice: Subject to any disclaimer, the term of this patent is extended or adjusted under 35 U.S.C. 154(b) by 98 days.

(21) Appl. No.: 17/465,168

(22) Filed: Sep. 2, 2021

(65) Prior Publication Data

US 2023/0064750 A1 Mar. 2, 2023

(51) Int. Cl.
*H04B 10/112* (2013.01)
*H04B 10/40* (2013.01)
*H04B 10/11* (2013.01)

(52) U.S. Cl.
CPC ........... *H04B 10/112* (2013.01); *H04B 10/11* (2013.01); *H04B 10/1129* (2013.01); *H04B 10/40* (2013.01)

(58) Field of Classification Search
CPC .............................. H04B 10/112; H04B 10/40
See application file for complete search history.

(56) References Cited

U.S. PATENT DOCUMENTS

| | | | |
|---|---|---|---|
| 6,347,001 B1 | 2/2002 | Arnold | |
| 7,215,472 B2 | 5/2007 | Smith | |
| 8,718,477 B2 | 5/2014 | DeVaul | |
| 9,270,372 B2 | 2/2016 | Miniscalco | |
| 9,729,234 B2 | 8/2017 | Lambert | |
| 10,187,153 B2 | 1/2019 | Adams | |
| 2002/0149811 A1* | 10/2002 | Willebrand | H04B 10/07 398/118 |
| 2006/0018663 A1* | 1/2006 | Moursund | H04B 10/1125 398/135 |
| 2007/0116471 A1* | 5/2007 | Bloom | H04B 10/1125 398/130 |
| 2009/0162071 A1* | 6/2009 | Refai | H04B 10/1127 398/131 |
| 2012/0074295 A1* | 3/2012 | Andressen | G01S 3/786 250/203.2 |
| 2013/0120744 A1* | 5/2013 | Ikeda | G08B 29/22 356/138 |
| 2014/0294399 A1* | 10/2014 | Makowski | H04B 10/118 398/126 |

(Continued)

OTHER PUBLICATIONS

Max Curran, "FSONet: A Wireless Backhaul for Multi-Gigabit Picocells Using Steerable Free Space Optics", MobiCom, Oct. 2017 (Year: 2017).*

(Continued)

*Primary Examiner* — Pranesh K Barua
(74) *Attorney, Agent, or Firm* — Pierson IP, PLLC

(57) ABSTRACT

A two-beam steering device comprising two single-beam steering devices and a motorized, rotating base stage, wherein each single-beam steering device is able to steer an electromagnetic wave beam in a full field of regard, wherein the two single-beam steering devices are fixed on top of the rotating base stage. The two-beam steering device can point the two individual beams into any direction pair in the entire field of regard with full flexibility.

15 Claims, 9 Drawing Sheets

(56) References Cited

U.S. PATENT DOCUMENTS

2015/0098707 A1* 4/2015 Pusarla .............. H04B 10/1121
  398/115
2019/0373173 A1  12/2019  Wang

OTHER PUBLICATIONS

Talmor, Amnon G, "Two-axis gimbal for air-to-air and air-to-ground laser communications", SPIE vol. 9739, 2016, Technical Journal Paper.

* cited by examiner

WIDE AND FULLY FLEXIBLE TWO-ELECTROMAGNETIC-BEAM STEERING DEVICE

FIELD OF THE INVENTION

The present embodiments relate primarily to the field of wireless communication networks in general and specifically to the case free-space optical (FSO) communications. The present embodiments enable wide and full flexibility in connectability for efficient utilization of network resources in high-level network topologies in order to achieve cost-effective and compact wireless communication solutions, such as commercially viable mesh FSO networks.

The present embodiments also relate secondarily to applications outside of the communication industry, such as 3D photography or videography with two cameras.

BACKGROUND

A two-beam steering device is required in applications such as free-space optical communication (FSO). In FSO systems, in order to utilize the communication resources efficiently, a higher level of network topology is preferable. For example, a mesh FSO network system must have at least two links at each network node. Furthermore, FSO requires a wide field of regard (FOR) for each node device in order to achieve high connectability between network node devices, whether they are at fixed locations or mobile.

Many forms of single-beam steering devices are available. For example, a stage lighting system uses a lighting fixture comprising multiple two-axis gimbal systems. Another example is a camera stabilizer, which is also a two-axis gimbal system. A device, such as a light source or a camera, attached to these steering systems can rotate and face any direction, usually within a hemispherical FOR. The direction of rotation is controlled by a motorized mechanism and software which is equipped with a specific algorithm to achieve intended functions.

To form a two-beam steering device, two single-beam devices can be used. However, if the two steering devices are attached in fixed positions, there would be blind spots in each device's FOR due to blocking by the other device.

The present embodiments concern a structure allowing full flexibility of two-beam steering in the full FOR such as a hemisphere.

SUMMARY

A two-beam steering device comprising two single-beam steering devices and a motorized, rotating base stage, wherein each single-beam steering device is able to steer an electromagnetic wave beam in a full field of regard, wherein the two single-beam steering devices are fixed on top of the rotating base stage. The two-beam steering device can point the two individual beams into any direction pair in the entire field of regard with full flexibility.

These, and other, aspects of the embodiments will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the embodiments, and the embodiments include all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 depicts an example of a single-beam steering device based on a two-axis gimbal structure. Two rotating stages direct the module attached to the arm into any direction in the hemisphere FOR.

FIG. 5 shows an angular range of the base stage required to operate the two-beam steering device to support the full hemisphere FOR.

DETAILED DESCRIPTION

Figure 2:
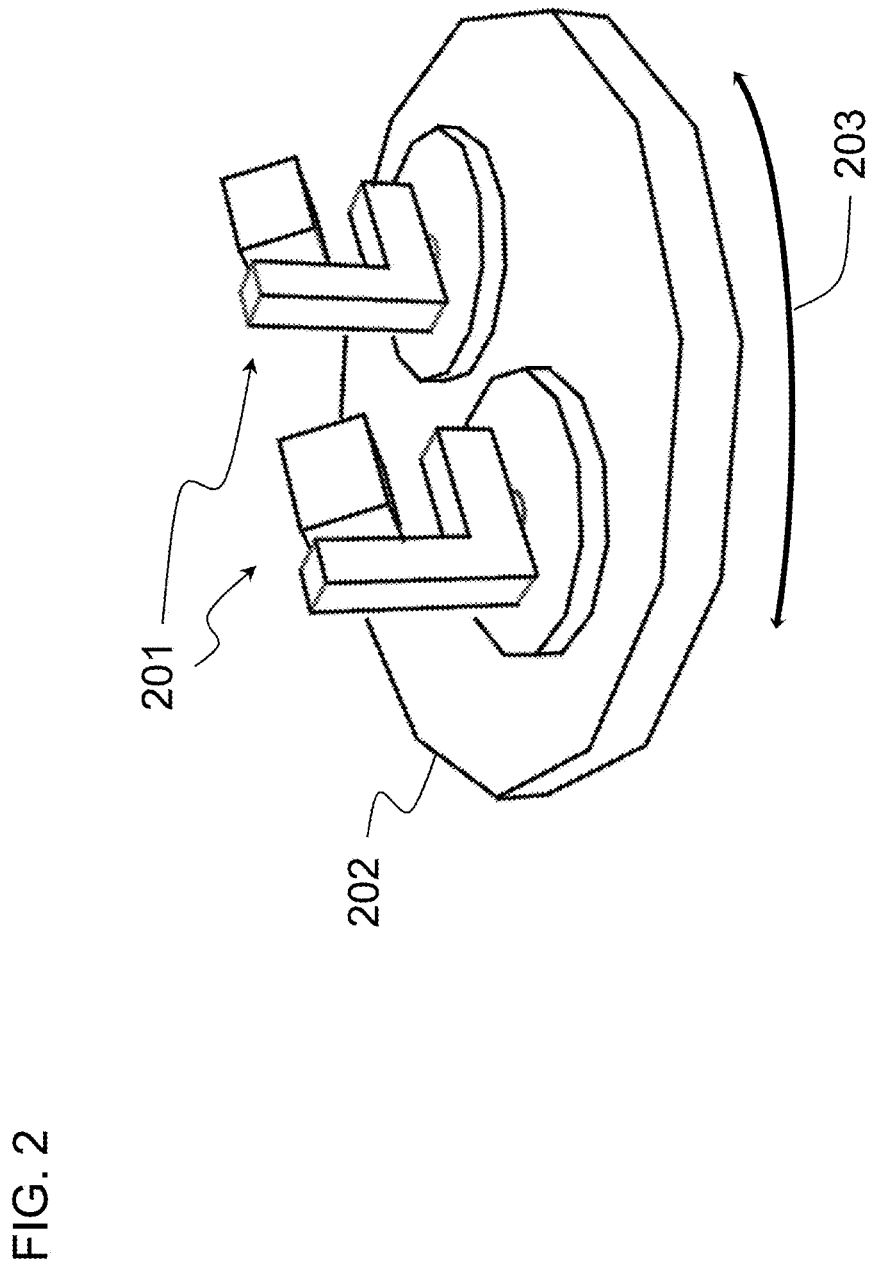
FIG. 2 depicts a two-beam steering device comprising two single-beam steering devices on top of a common rotating base stage.

FIG. 2 shows an illustrative representation of a two-beam steering device configuration in which two single-beam steering devices 201 are attached on top of a rotating stage 202. The purpose of the base rotating stage 202 is to make it possible for each single-beam steering device 201 to point the transceiver module, represented by a box attached to the arm of the device, toward an intended target in any position in the device's hemisphere FOR without any limitation (i.e., no blind spot). If the two devices 201 are attached to fixed positions on a stationary base plate, one single-beam steering device will block the FOR of the other steering device for certain target positions. By having another degree of rotation 203 at the base stage 202, the two-beam system can direct or connect both beams to any point in the entire hemisphere FOR without any limitation. This is a significant advantage when a wide FOR is required for applications such as free-space optical communication (FSO) systems.

A field-of-regard (FOR) is commonly defined as the total area over which a sensor can capture the input, including sensing in any position of the sensor within the system. In this description of the present embodiments, it is understood similarly that FOR is the total area/volume in which a beam of a device can point. For the two-beam steering device of the present embodiments, it includes the movement of a single-beam steering device and the base stage in the system.

Figure 3:
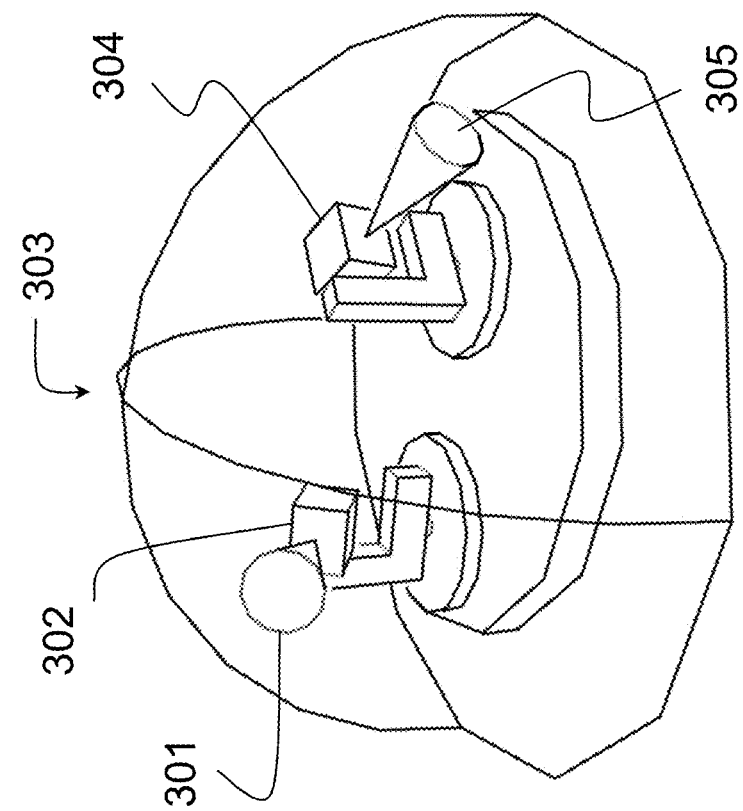
FIG. 3 depicts the field of regard of a two-beam steering device comprising two single-beam steering devices each having a transceiver module attached to it and the field of view of each transceiver module.

FIG. 3 shows the field of regard of the two-beam steering device and the field of view of each transceiver module of the single-beam steering module. Here, the field of regard 303, shown by a frame for the hemisphere, is the area the two-beam steering device can cover as a system, by using all the motion axes, namely two axes of rotation of the single-beam steering devices and an axis of rotation of the base rotating stage, wherein each of the single-beam steering devices can be independently rotated. This two-beam device can connect with or point at least one beam to a target in the hemisphere volume, FOR. The field of view (FOV) of a transceiver module is the area covered by the transceiver module in any one position of the module. It is a property of the module and, in FIG. 3, it is depicted as a narrow, cone-shaped volume. The FOV 301 of the single-beam steering device 302 determines the direction of the module. Another single-beam steering device 304 has its FOV 305 in another direction. Both FOVs, 301 and 305 are within the total FOR of the system 303. When the single-beam steering device and/or the base stage rotate in all possible directions, the FOV of each transceiver module scans the FOR of the system.

The word "beam" is defined here for the purpose of the description of the present embodiments. An optical beam is usually understood as a collimated optical energy flow. Electromagnetic (EM) waves are concentrated around a line which indicates the center of the optical beam, and along the beam, and the EM wave energy flows without spreading extensively. An optical beam can be formed with a lens system or a mirror system, for example. The same definition also applies to other wavelength ranges of EM waves. In the case of longer wavelength EM waves, such as microwave, mirror systems are often used to form a microwave beam. A beam in this description includes both directions of the energy flow. Often, a beam from a device is understood as the energy flow out from the device. In this description, the energy flowing into the device is also considered as a beam of the device. It includes a wider definition of beam as a vector from a device to another point in the space, within the field of regard of the system. Furthermore, a beam in this description includes the field of view of a sensor or a camera. In such cases, the center of the field of view is pointing toward the target location when the system aligns the beam to a target.

Figure 1:
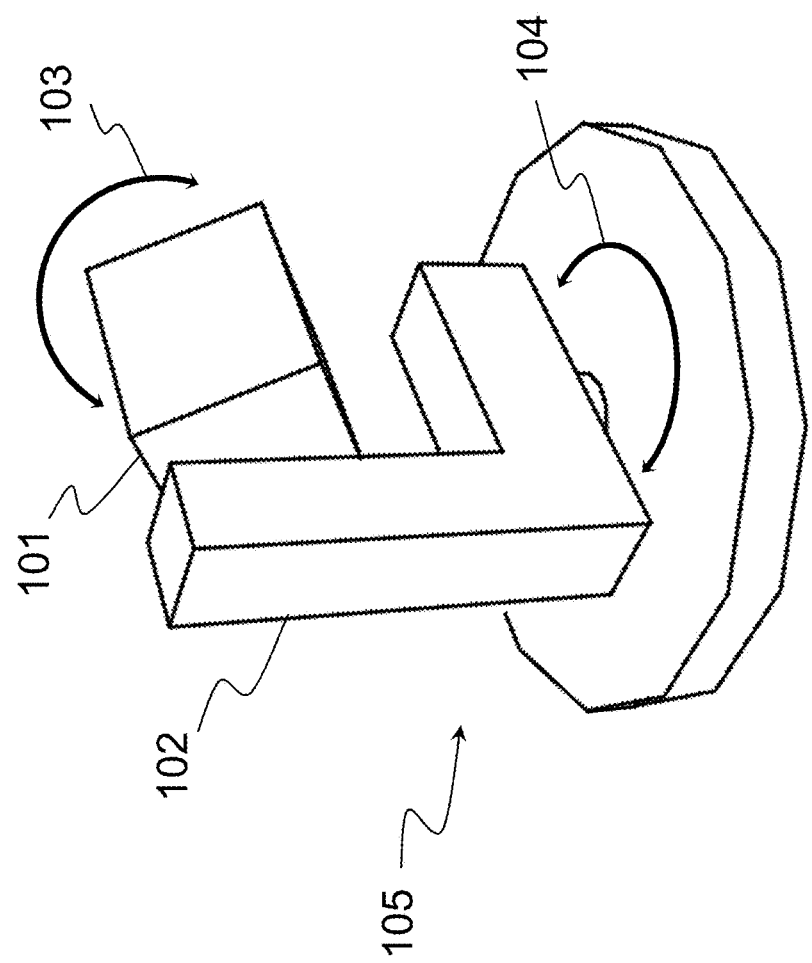

An example of a single-beam steering device 100 configuration is shown in FIG. 1. Since this device scans the beam in its hemisphere FOR, it must have two axes of rotation. In FIG. 1, 104 indicates the rotation in the azimuthal direction, and 103 indicates the rotation in the elevation direction, and combining them together the system can point the transceiver module 101 in any direction in the hemisphere FOR to align the beam of the transceiver module and the target. In embodiments utilizing two single-beam steering devices 100, each of the two single-beam steering devices may be independently and individually rotated in the azimuthal direction and elevation direction. Additionally, in embodiments utilizing two single-beam steering devices 100, both of the single beam steering devices 100 may be simultaneously rotated by the base stage. In this coordinate system, the hemisphere FOR of the single-beam steering device has a range of 360° in azimuth and 90° in elevation. It is known that the range of rotation of a common single-beam steering device could be 0° ~180° for the azimuthal direction and 0° ~180° for the elevation direction as a minimum range of rotation. In the case of FSO applications, in order to match the FOR of the transceiver's emitter and receiver, it is advantageous to have an angular range of 0° ~360° for the azimuthal direction.

FIG. 1 shows a typical two-axis gimbal structure to achieve the single-beam steering function. This configuration is often seen in applications such as stage lighting systems and camera stabilization frames. It has two rotating stages connected so that the axes of rotation of the two stages are perpendicular to each other. Depending on the application and the system's physical limitations, the angle between the axes of rotation is not always 90°.

Often, mechanical rotational stages are used to form the single-beam steering device and the base stage. In the optical engineering space, the automation industry, and the robotics industry, many options of such stages are known and available. For illustration purposes, the list of such motorized rotating stages includes stepper, direct drive, piezo and DC servo motors. Some of the parameters needed to consider when choosing the rotating stages are range, speed, load, resolution, stability, and lifetime.

Several configurations are possible for the integration of the transceiver module into the single-beam steering structure. In one configuration depicted in FIG. 1, a complete transceiver module is attached to the elevation arm 102 of two-axis gimbal structure. The complete transceiver module comprises all components required for generating electromagnetic (EM) waves, modulating EM waves, collimating/focusing EM waves to a beam form, collecting incoming EM waves from other devices or the surrounding environment, detecting EM waves, filtering wavelengths or polarizations in EM waves, and connecting with electrical interfaces. In FIG. 1, the box 101 represents this complete transceiver module in, for example, FSO applications. The collimation and focus of the EM wave in this configuration is controlled fully by the transceiver module, and the direction in which the beam points is controlled by the steering mechanism. The simplest orientation of the transceiver module attached to the arm is in a perpendicular position where the axis of rotation in the elevation and the beam of the transceiver are at a 90° angle to each other. In this case, the rotation of the transceiver module in the elevation steers its beam in the elevation direction only. It is also possible to attach the transceiver module in other orientations. It is important to ensure that the top of the hemisphere FOR is accessible when the transceiver module is attached to the arm other than perpendicular position so that the full hemisphere FOR is covered. However, it cannot be a parallel position in which there is only one axis of rotation in the system, and the mounting angle should not be too shallow in order to facilitate designing the system to support the full hemisphere FOR.

Another configuration to integrate the transceiver module into the single-beam steering structure is to attach only passive optical elements to the moving stages. For example, Talmor (SPIE vol. 9739) describes the lens and mirrors attached to the rotating enclosure to steer an optical beam in its hemisphere FOR. In this type of configuration, the active optical components, such as light sources and photodetectors, are attached to the positions in the system that are fixed. Since there is no mechanically moving interface, this configuration makes it easy to wire the active optical components. This is an advantage if the transceiver handles very high data rate signals or includes multiple sources and detectors with many wires.

One of the applications of the two-beam steering device is free space optical communication (FSO). As described in publications, for example Miniscalco (U.S. Pat. No. 9,270,372), it is well known that each node must have at least 2 communication links in order to form a mesh network or a closed loop network in FSO communication (or any other wireless communication system). Since FSO nodes or devices are wirelessly connected, the nodes can be placed at fixed positions or can be mobile. To support as many devices as possible, and a network as flexible as possible, a wide FOR of the network nodes is crucial.

Figure 4:
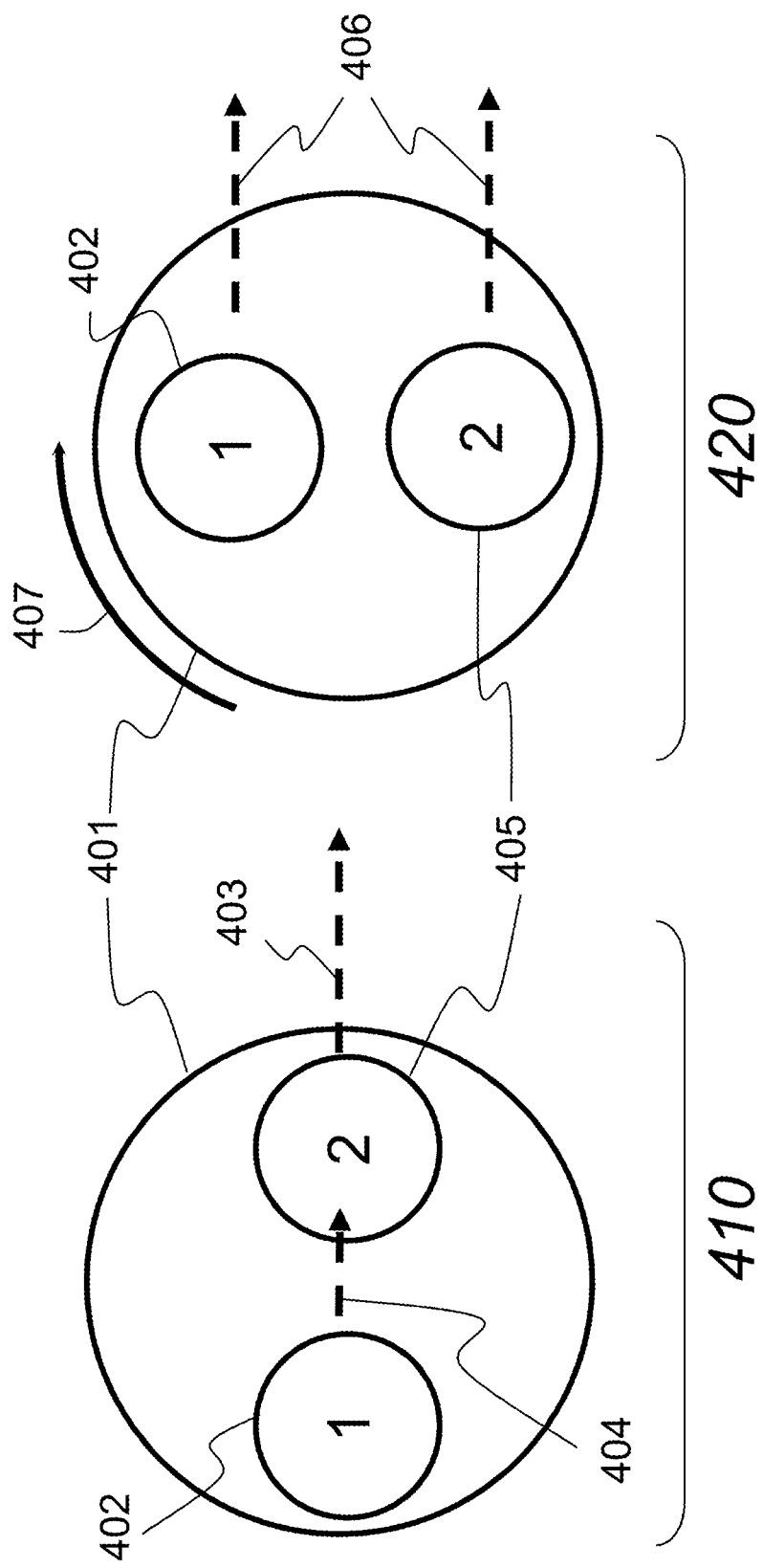
FIG. 4 shows a case of one device blocking another device's FOR and a rotated base stage position which allows both devices to direct their beams to their intended directions.

An example of a two-beam steering device configuration is that two single-beam steering devices used together at a node, attached to a fixed baseplate. This node configuration has two-link capability with two beams. However, with the devices' position fixed, one of the steering devices blocks part of the FOR of the other steering device. This situation is easily observed in FIG. 4. FIG. 4 is an illustrative depiction of a two-beam steering device seen from the top. Two single-beam steering devices 402 and 405 are numbered 1 and 2 in the figure to distinguish the device identity. In the two-beam steering device 410, both single-beam steering devices 1 and 2 have target nodes (not shown in the drawing) located on the right side of the drawing, the direction indicated by the broken line arrows 403 and 404.

Device 2 has a clear path 403 toward the target node without obstruction. However, device 1 has device 2 blocking the path 404 toward its target node, resulting in device 1 not having a direct line of sight to the target node. Depending on the shape and the size of the single-beam device, the FOR blocked by the other single-beam device can be significantly large and limits the connectability of such a system severely.

The present embodiments solve the problem by adding a motorized rotating stage 401 as the common base to which both single-beam steering devices are attached. The axis of rotation in the azimuth direction of the single-beam steering devices and the axis of rotation of the base rotating stage 401 are parallel so that the FOR of the two devices match closely the rotation of the base stage 401. In addition, both of the single-beam steering devices 1, 2 should be attached to the same side of the rotating base stage 401 so that the FOR of these two devices 1,2 match. With this configuration, when the blocking situation described in 410 happens, the base rotating stage 410 rotates (407) so that both single-beam steering devices 1,2 can find clear paths toward the target nodes (406), as shown in 420. It is easy to understand that this configuration allows both single-beam steering devices to have full hemisphere FOR without any limitation. Any line-of-sight blocking situation can be solved by rotating the base to the proper position. It is a significant advantage to have complete addressability of the entire hemisphere FOR in FSO system nodes.

Figure 5:
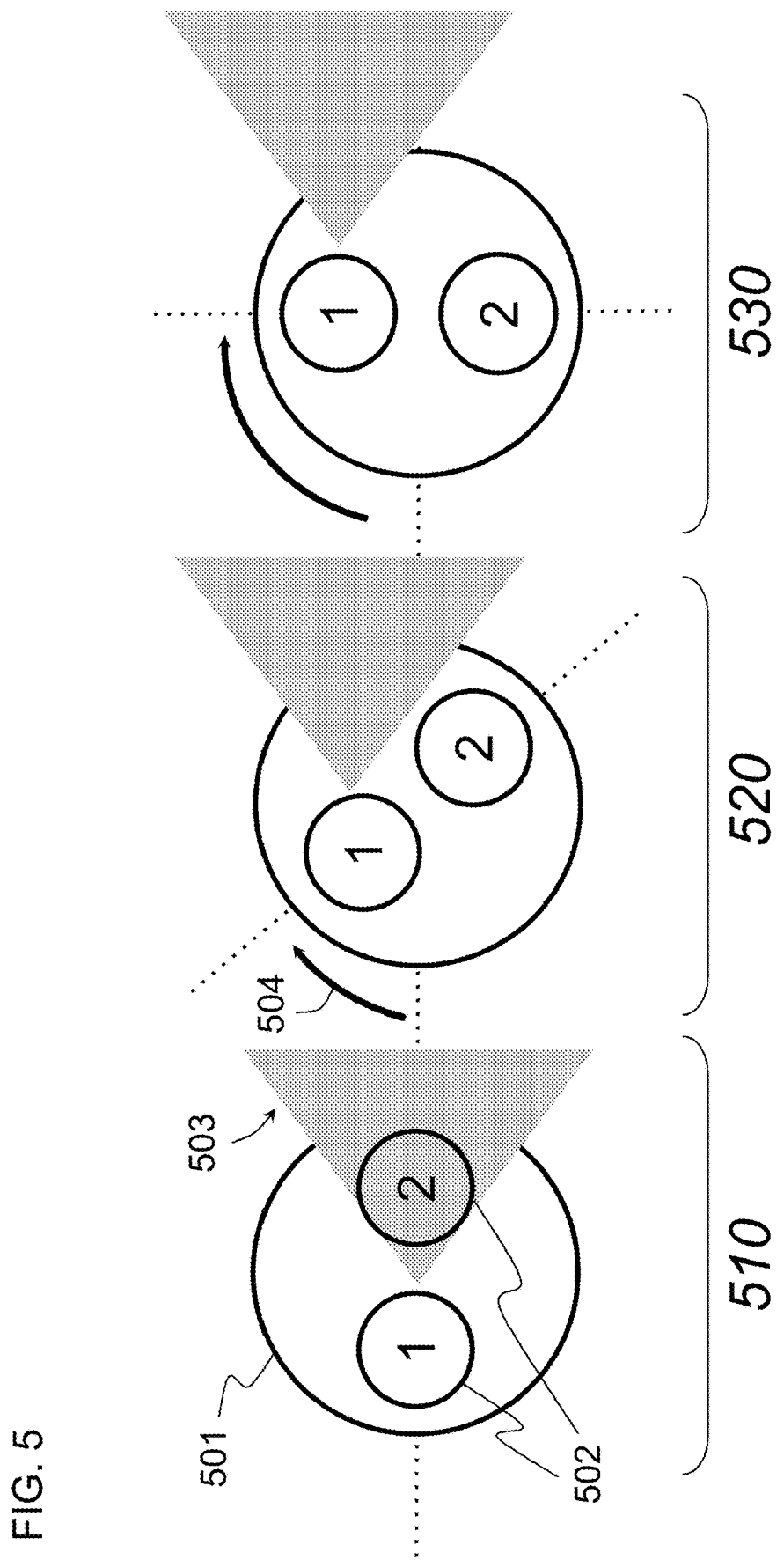

The range of rotation of the base stage 501 required to support the full hemisphere FOR is only 90°, as shown in FIG. 5. If the initial position 510 of the base stage 501 the FOR of device 1 blocked by device 2 is toward the right side of the drawing indicated by the shaded area 503. To clear the path, the base stage 501 needs to rotate (504) less than 90°, as shown in 520 and 530. It is clear from FIG. 5 that with a 0° 90° range of rotation of the base stage 501, both single-beam steering devices 1, 2 can create a link to a target in any position in the hemisphere FOR. The relatively small rotational range of the base stage is a significant advantage considering the positions of the devices attached to the base stage.

Figure 6:
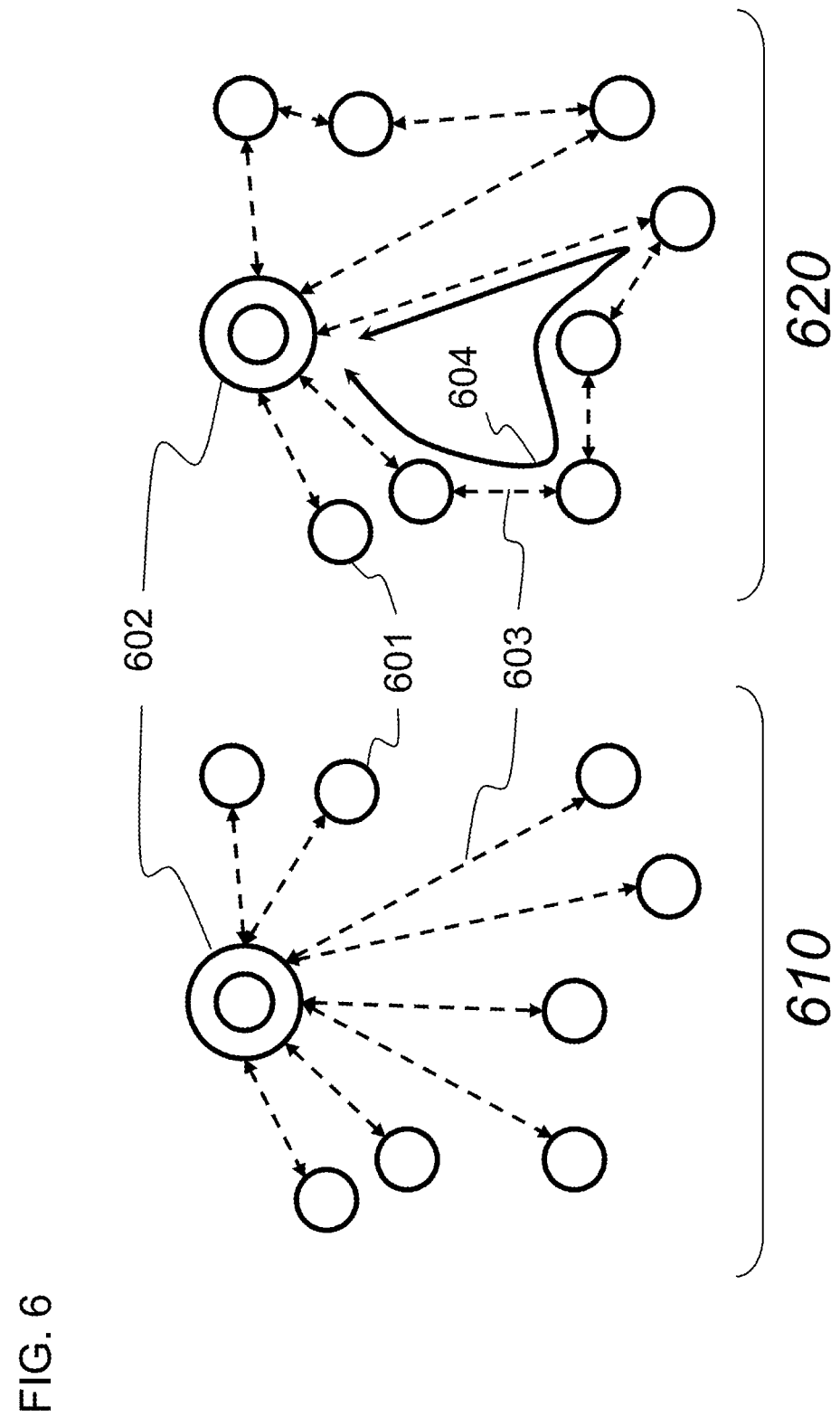
FIG. 6 shows potential network topologies using only single-beam steering devices and two-beam steering devices.

Two-beam steering devices increase the efficiency of resource utilization when used in an FSO communication network. FIG. 6 shows diagrams of FSO network topologies with and without two-beam capability. In FIG. 6, a circle 601 represents a client node which is an FSO addressable device attached to a beam-steering system that generates and receives data via an FSO network. FSO addressable devices could be computers, cell phones, tablets, sensors, cameras, smart audio units, factory machinery, robots, vehicles, etc. A double-circle 602 represents a station node that is able to connect to multiple nodes in the FSO network and route the communication traffic between the Internet and local FSO networks. A dashed line 603 represents a communication link including both uplink and downlink. Configuration 610 shows an example of network topology without two-beam (or two-link) capable client nodes. All client nodes can make only a single connection with their single beam, with the station unit. In this case, all client units are directly connected to the station unit. The station is required to have the capability of handling a large number of clients at a time, i.e., equipped with a large number of beam capability. This requirement makes the station unit large and expensive. In this case, the total data rate of the network is significantly limited by the capacity of the station unit.

On the other hand, configuration 620 shows an example of network topology using two-link nodes for the same number of clients. Here, the client nodes 601 can make 2 links at a time represented by the two dashed arrows at each client node. Because of the two-link capability, this network allows client nodes to make a connection with another client node in addition to the station node, or connections to two client nodes. This configuration enables a loop network such as 604. In the example of FIG. 6, the 610 topology requires 8 links from the station device, however the 620 topology requires only 5 links from the station device. This shows that with two-link capable client nodes, station node resources are used much more efficiently, thereby increasing the data throughput significantly. A small and low-cost station unit is made possible with the present embodiments.

In this description, we mainly discuss a device with up/down links sharing the same path and we refer to the device as having a "single beam". However, the present embodiments are generally applicable to devices with separate dedicated up/down link paths by adding another axis of rotation, i.e., another motorized rotation for the transceiver unit so that it can align the two paths to the two apertures of a target device.

Figure 7:
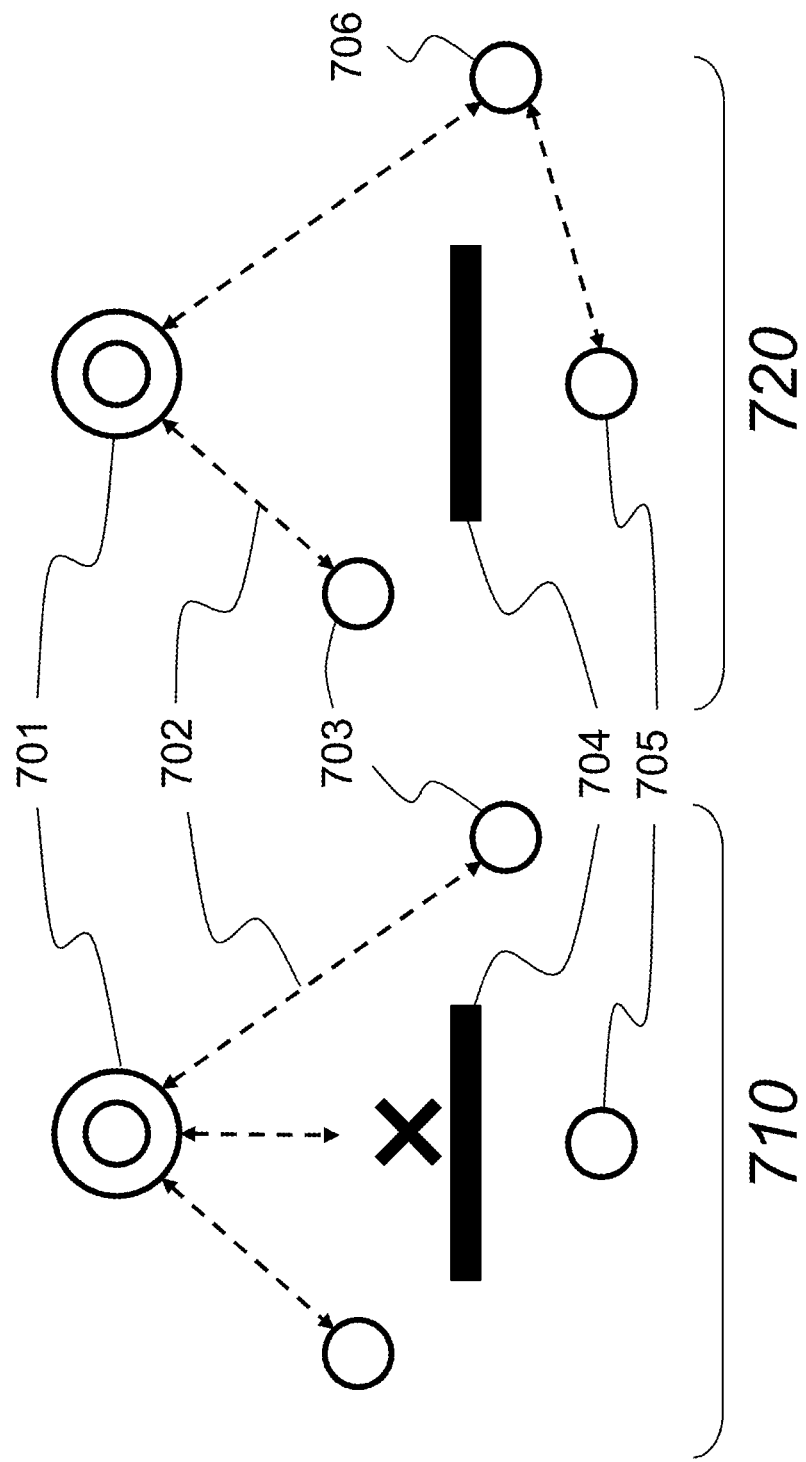
FIG. 7 shows utilization of two-beam steering devices in an FSO network to make a connection with a device which does not have direct line of sight from the station device.

Another advantage of two-link nodes is the ability to create a communication path for a node without line-of-sight visibility from the station node. FIG. 7 shows the solution in a diagram similar to that of FIG. 6. The double-circle 701 is a station node that is connected to the Internet. All data needs to reach the station node to connect to the Internet. With only single-beam client nodes, configuration 710 shows the client node 705 which, without direct line-of-sight visibility of the station node, cannot make a connection to the station node due to the blocking object 704. However, with two-link capability, configuration 720 shows that a client node 705 without direct line-of-sight visibility of the station node can make a connection via another client node 706 that has two-link capability. This advantage of two-beam capability addresses the line-of-sight limitation of free space wireless communication systems.

When the transceiver of the single-beam steering device is designed for wireless communication purposes, a beam may comprise multiple "beams" in the same direction to form both up and down links of the data stream. The beam position and orientation could be the same if the optics design is for up/down links to share the same components such as lenses and mirrors, which also results in sharing the optical path outside the device. When the up and down links have their own dedicated optics, they may have slightly different optical paths, usually in the same orientation but shifted. In the present embodiments, we consider a device with up/down links with the same target device as having a "single beam".

Figure 8:
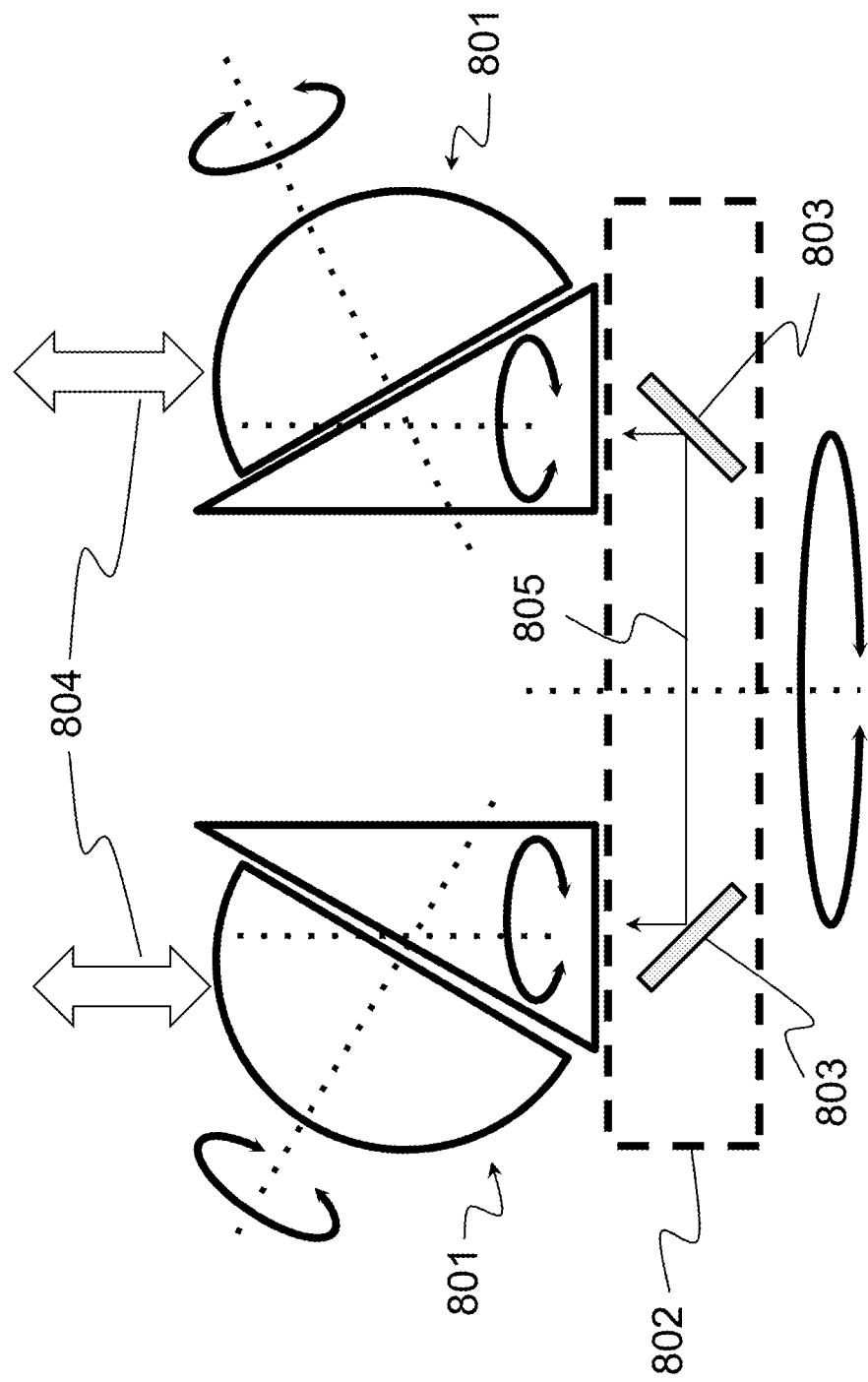
FIG. 8 depicts an example of an optical relay configuration using the present embodiments. It includes only passive components so that the optical signal is routed without optical-electrical conversion in the device.

The present embodiments' structure also allows to form an optical relay when only passive optical components are used for the transceiver modules in the single-beam steering devices and they are connected optically in the base stage section. FIG. 8 shows an example of such an optical relay device illustratively. Two single-beam steering devices 801 are placed on a motorized rotating stage 802 whose inside structure is shown in the figure. All optical components in this device are passive devices such as lenses, mirrors, filters, etc., therefore no optical-electrical conversion occurs in the device. One exception to passive devices could be an optical amplifier if needed to increase the optical power in the device. However, even with an optical amplifier, there is no optical-electrical conversion. Optical signals 804 received and routed through one of the single-beam steering devices enter the base stage, then mirrors 803 direct the signal 805 to the other single-beam steering device. The base stage 802 is able to rotate to form a two-beam steering device of the present embodiments. It is possible to add optical-electrical conversion in this device so that part of the signal can be delivered to the node. The majority of the optical signal passes through this device toward the next node. This configuration allows simple device structure, simple control, low cost, and low power consumption. This configuration is suitable for FSO optical relay modules that connect nodes in non-line-of-sight locations.

Figure 9:
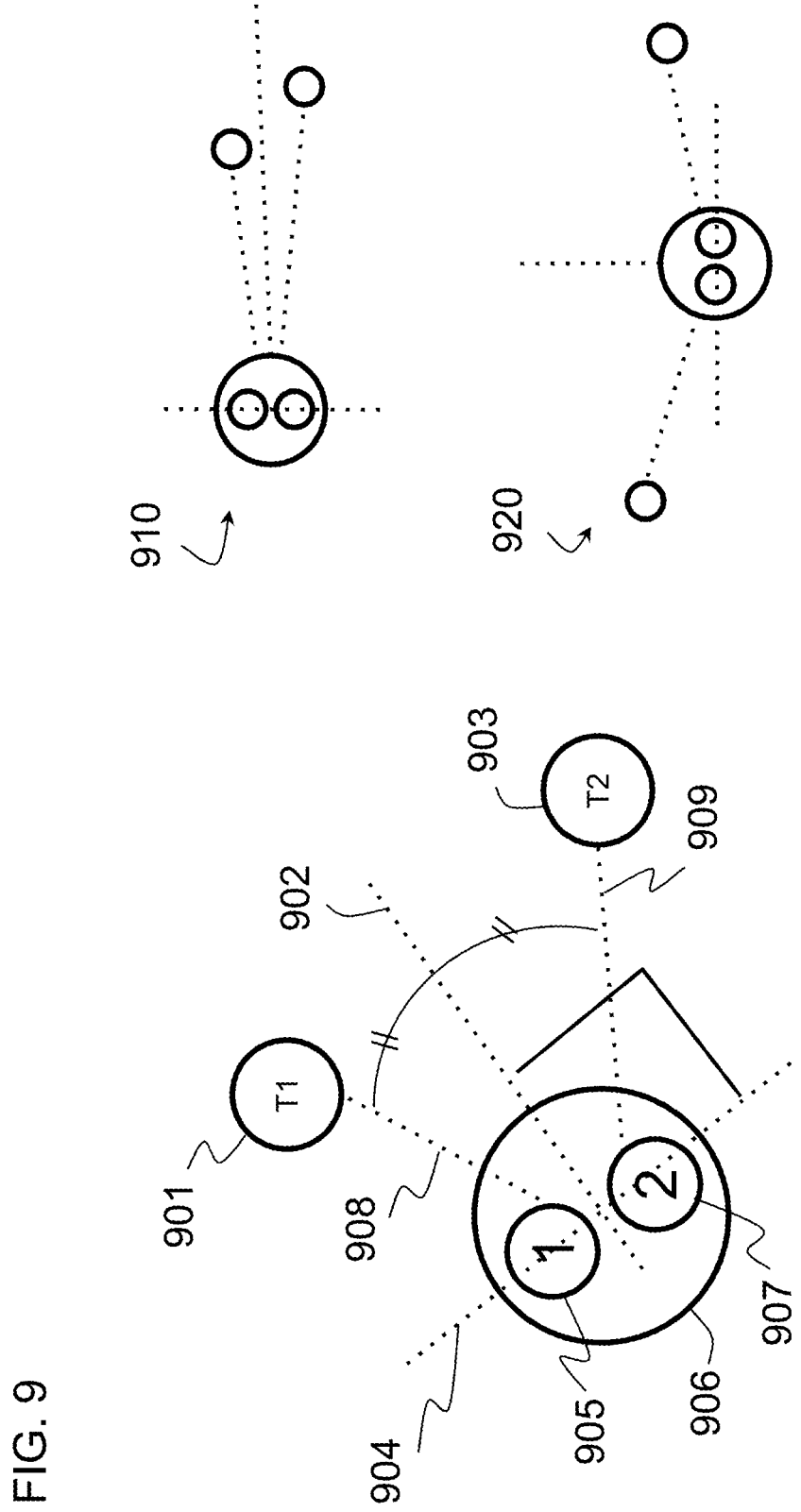
FIG. 9 shows a method to decide the angle by which to rotate the base stage so that both single-beam steering devices have a clear path to their targets positions. Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

An algorithm to determine the base stage position to allow both single-beam steering devices to have full hemisphere FOR is shown in FIG. 9. In FIG. 9, the target position for transceiver modules 1 and 2 to point to are labeled as T1 and T2, respectively (901 and 903). This diagram illustrates a two-beam steering device and two target devices seen from the top of the device. The base stage rotation is in the azimuthal direction. The positions of target devices are known or given to the two-beam steering device. The azimuthal directions of the targets T1, T2, are calculated based on the two-beam steering device position and orientation, shown by the dashed lines 908 and 909. Then a bisector 902 of the angle formed by the two targets is calculated. The base should rotate to the position where the line 904 connecting, and extending through, the two single-beam steering devices 905, 907, is perpendicular to the bisector 902. Diagrams 910 and 920 show example positions based on this algorithm with two different target locations. In both cases, the single-beam steering devices have clear line-of-sight visibility of the target devices. This algorithm guarantees a clear line-of-sight visibility of any target position. However, it may not be the most efficient, since it always asks for a rotation if there is any change in the target positions. A more efficient method determines if the rotation of the base is necessary based on the amount of change of the target positions and the portion of FOR blocked by the paired single-beam steering devices. Such an algorithm requires detailed design information of each specific system.

The application of the present embodiments is not limited to FSO communication systems. For example, with different frequencies of operation, microwave-based wireless communication systems can utilize the two-link capability of the configuration in the present embodiments. In a conventional microwave communication system, the position of the nodes is designed, known and fixed, since the usage of such systems is predominantly in backhaul networks. However, with more and more devices and modules requiring communication to the Internet, all means of communication will be utilized to maximize the communication capacity of the Internet or IoT (Internet of Things) applications. When microwave-based networks start including mobile modules or dynamic development of the network topology, the two-link (i.e., two-beam) device with beam steering capability of the present embodiments will be an essential element of the system.

As an example of applications outside of the communication industry, these embodiments can be used to easily capture 3D photography or videography with two cameras. When the transceiver modules in the 2-beam steering device are cameras, the resulting images or videos will be 3D stereo photographs or videos. Synchronized motion of the rotating base stage and the azimuthal rotation of the single-beam steering device create the pan movement of the camera system and the tilt motion is handled by the motion in the elevation direction of each single-beam steering device.

Technical journal publications and patents have described FSO mesh networks and their requirement of two-link devices. For example, Miniscalco (U.S. Pat. No. 9,270,372) described that FSO nodes must have at least two-link capability to form an FSO mesh network. However, he did not specify an implementation of the device that makes network nodes with two-link capability. Miniscalco only described examples of beam steering mechanism, e.g., Smith (U.S. Pat. No. 7,215,472), which has a relatively small FOR for each single-beam steering system.

FSO communication nodes with multiple transceiver modules have also been discussed in the prior art. Often, the transceiver modules are fixed on a stationary fixture with static positions. The purpose of the configuration could be the wide coverage of the FOR of the node. For example, Adams (U.S. Pat. No. 10,187,153) described a communication node configuration where a node core has fixed on it a plurality of transceiver modules that control the communication signals in and out of each transceiver electronically. This setup aims to cover a wide FOR with multiple transceivers so that the network can form a mesh network topology. However, all transceivers are placed at fixed positions without physical steering capability. An example of multiple transceivers with steering capability is DeVaul (U.S. Pat. No. 8,718,477). In FIG. 3, he describes two steering modules 328, 334, attached to the main payload. His intention to use two modules is to cover a full sphere FOR when the FOR of each module is on the opposite side of the payload. This system can address a single target point in the full sphere FOR of the system, but it cannot connect with two targets on the same hemisphere FOR. Furthermore, his configuration does not have the controlled movement of the base, or payload, for the link alignment purpose. Another example is an optical relay described by Lambert (U.S. Pat. No. 9,729,234). The device is an optical bent pipe which relays communication signals coming into one optical terminal of a node to the other terminal of the same node so that the network has multi-hop links. For this purpose, each node has at least two optical terminals. Lambert described each terminal separately and only mentioned that it is a "gimbaled telescope" and did not mention how the two optical terminals are configured on the node physically.

A two-beam steering system used in an application other than communication system is described by Wang (US App 2019/0373173). A drone is equipped with two cameras on a two-axis gimbal. Each camera can be synchronized and controlled from a remote control together with the main drone. As opposed to the capability in the present embodiments, both camera systems are fixed on the drone without the capability to rotate the pair relative to the drone body. Wang's drone system cannot solve the FOR blocking situation without moving the drone body itself with all the equipment on it.

A system with a gimbal structure on another motion stage, another gimbal, has been reported by Arnold (U.S. Pat. No. 6,347,001). In the system, multiple transceiver modules have different degrees of movement so that the system has coarse and fine alignment capability. Arnold's communication node has one target link, possibly with both uplink and downlink capability, and the multiple transceivers are pointed to more or less the same direction, without a blocking situation in this application. Furthermore, the device cannot make a connection with two separate targets. Often such a system has a nested gimbal structure similar to Arnold's, and it is distinctly different from the structure of the present embodiments where two separate gimbal structures are mounted on a rotating stage.

What is claimed is:

1. A two-electromagnetic-beam steering device comprising:
   a plurality of single-beam steering devices, each of the plurality of single-beam steering devices including an electromagnetic wave transceiver module configured to control a beam, a two-axis beam steering module, and control/communication electronics, the plurality of single-beam steering devices including a first single-beam steering device and a second single beam steering device, the first single beam steering device being positioned on a first platform, and the second single beam steering device being positioned on a second platform;
   a base including a motorized rotating stage disposed relative to said plurality of single-beam devices as to have overlap between the field of regard of said plurality of single-beam steering devices, and said plurality of single-beam steering devices positioned on the same side of a base stage plane, wherein the motorized rotating stage is a mechanical rotating stage;
   a control module having driver electronics and control electronics for said plurality of single-beam steering devices and said motorized rotating stage, wherein the motorized rotating stage is configured to simultaneously rotate each of the plurality of single-beam steering device in a first rotational plane, wherein the control module is configured to allow the first platform to rotate in a second rotational plane independently from the second platform, the first rotational plane being in parallel to the second rotational plane.

2. The device of claim 1, wherein the electromagnetic wave transceiver module is a free-space optical communication module operating within the optical spectrum including ultra-violet, visible, and infrared wavelengths.

3. The device of claim 1, wherein the electromagnetic wave transceiver module is a free-space wireless communication module operating at radio frequency (RF) including microwave, millimeter wave, and terahertz (THz) wave.

4. The device of claim 1, wherein the electromagnetic wave transceiver module is a camera module.

5. The device of claim 1, wherein the beam is an optical beam.

6. The device of claim 1, wherein the beam is a radio frequency beam.

7. The device of claim 1, wherein the beam is a field of view of a sensor.

8. The device of claim 1, wherein the beam is a field of view of a camera.

9. The device of claim 1, wherein the beam comprises a plurality of beams from a set of beams including an optical beam, a radio frequency beam collimated with mirrors, a field of view of a sensor, and a field of view of a camera.

10. The device of claim 1, wherein the electromagnetic wave transceiver module includes a wireless communication module supporting uplink and downlink signals, said wireless communication module comprising an electromagnetic wave source, an electromagnetic wave detector, and an optical system including a combination of lenses, mirrors, prisms and filters.

11. The device of claim 1, wherein the two-axis beam steering module of each of the plurality of single-beam steering device has a two-axis gimbal structure, wherein the first single-beam steering device is configured to be oriented at a first angle by rotating the first stage, the second single-beam steering is configured to be oriented at a second angle by rotating the second stage, wherein the motorized rotating stage is rotated to a position that is perpendicular to a bisector of the first angle and the second angle.

12. The device of claim 11, wherein each of the plurality of single-beam steering devices includes a transceiver module an elevation axis of said two-axis gimbal structure and oriented to form a non-zero angle between the elevation axis and the beam.

13. The device of claim 11, wherein each of the plurality of single-beam steering devices includes a combination of active and passive transceiver module components mounted to a non-moving base of each of the plurality of single-beam steering devices.

14. The device of claim 1, wherein the electromagnetic wave transceiver module includes only passive optical components and said plurality of single-beam steering devices are connected optically via said motorized rotating stage so that said two-electromagnetic-beam steering device is an optical relay without optical-electrical conversion at the device.

15. The device of claim 1, further including:
   a mesh or a loop free-space wireless communication network formed with at least one station device and a plurality of said two-electromagnetic-beam steering devices.

* * * * *